Jan. 6, 1970  W. B. TUCKER  3,488,539
ALUMINUM DISC ARMATURE WITH COPPER BRUSH TRACK
Filed April 3, 1967  8 Sheets-Sheet 1

INVENTOR.
WILLIAM B. TUCKER
BY
Morgan, Finnegan, Durham & Pine
ATTORNEYS.

Jan. 6, 1970   W. B. TUCKER   3,488,539
ALUMINUM DISC ARMATURE WITH COPPER BRUSH TRACK
Filed April 3, 1967   8 Sheets-Sheet 4

INVENTOR.
WILLIAM B. TUCKER
BY
Morgan, Finnegan, Durham & Pine
ATTORNEYS.

Jan. 6, 1970  W. B. TUCKER  3,488,539
ALUMINUM DISC ARMATURE WITH COPPER BRUSH TRACK
Filed April 5, 1967  8 Sheets-Sheet 5

FIG. 10

INVENTOR.
WILLIAM B. TUCKER
BY
Morgan, Finnegan, Durham & Pine
ATTORNEYS.

FIG. 11

Jan. 6, 1970 W. B. TUCKER 3,488,539
ALUMINUM DISC ARMATURE WITH COPPER BRUSH TRACK
Filed April 3, 1967 8 Sheets-Sheet 7

FIG. 12

INVENTOR
WILLIAM B. TUCKER
BY
Morgan, Finnegan, Durham & Pine
ATTORNEYS

FIG. 13

INVENTOR
WILLIAM B. TUCKER

United States Patent Office

3,488,539
Patented Jan. 6, 1970

3,488,539
ALUMINUM DISC ARMATURE WITH COPPER
BRUSH TRACK
William B. Tucker, 10 Gabriele Drive,
East Norwich, N.Y. 11732
Filed Apr. 3, 1967, Ser. No. 627,969
Int. Cl. H02k 1/22
U.S. Cl. 310—268                                    7 Claims

ABSTRACT OF THE DISCLOSURE

A permanent magnet type DC machine including a disc armature. The disc armature is constructed including uniform planar arrays of aluminum winding segments insulated from one another, the winding segments being interconnected by bridging connections to form at least one closed series circuit. A copper brush track is metallurgically bonded to the outer surface of one of the aluminum arrays to provide an exposed commutating surface.

---

This invention relates to electrical rotating machinery of the type often having a disc shaped armature. Machines of this general type are disclosed in U.S. Patent 3,144,574 issued to J. Henry-Baudot on Aug. 11, 1964, the disclosure of which is incorporated herein and forms a part hereof.

In a disc type electrical machine the armature conductors are usually located in two or more separate planes which lie on opposite sides of an insulating carrier. Half of each armature turn is located on one side of the carrier and the other half is located on the other side of the carrier so that an entire armature winding can be constructed without crossing conductors on the surface of the carrier. The armature is energized (in the case of a motor) by brushes bearing directly on the flat, closely spaced armature conductors thereby eliminating the need for a separate commutator. The resulting electrical machine normally does not include iron in the armature and as a result it is a low inertia machine with essentially linear acceleration and deceleration characteristics.

It is an object of this invention to provide an electrical machine of the disc armature type which can be constructed at a lower cost.

It is another object of the invention to provide a disc type electrical machine in which the armature inertia is further reduced.

In the armature structure according to this invention aluminum is used to replace the copper normally found in the armature. The resistivity of aluminum is greater than copper and therefore the quantity of conductive material required in the aluminum armature is greater than would be required in a comparable copper armature. Even so, the aluminum armature is lighter and provides a better ratio of torque to inertia. At current prices, the aluminum armature is considerably less costly.

Aluminum tends to oxidize and forms a highly resistive surface coating such that it is not possible to energize an aluminum armature by means of brushes bearing upon the aluminum surfaces of the winding segments. Copper, normally several thousandths of an inch thick, is therefore metallurgically bonded to an exposed aluminum surface to provide a copper brush track. Preferably, the copper is confined to an annular ring merely sufficient to provide the brush track to thereby minimize the bimetallic bending effect which would otherwise tend to warp the armature as the operating temperature changes. The armature can be made by either (1) using a copper clad aluminum and etching away unwanted copper, (2) plating copper onto selected portions of the aluminum surface, or (3) bonding copper to selected portions of the aluminum surface by thermo-compression bonding.

The invention is described in greater detail in the following specification which sets forth several illustrative embodiments of the invention. Although the invention is described with respect to electrical motors, it is also applicable to generators on other electrical equipment. Furthermore, the invention is not limited to disc shaped armatures, but is applicable to other armature shapes as well. The drawings form part of the specification wherein:

The armature in a disc type machine includes a large number of generally radially extending winding segments distributed evenly about an annular area that will be adjacent the magnetic pole faces in the completed machine. These winding segments are interconnected to form a continuous closed armature winding. Successive winding segments are displaced by a distance approximately equal to the distance between adjacent pole centers of the associated magnetic structure and are interconnected so that current flow is in one direction across the north magnetic poles and in the opposite direction across the south magnetic poles.

The armature constructed in accordance with this invention includes radially extending aluminum winding segments arranged in at least two parallel arrays conveniently located on opposite sides of an insulated carrier disc. In the completed armature one such array of winding segments is provided with a copper brush track.

Figure 1:
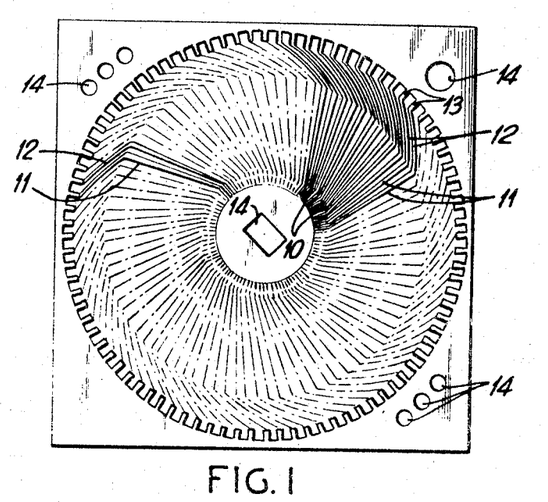
FIGURE 1 is a plan view illustrating the metal stamping used to form the conductor arrays in the armature.

An array of radially extending winding segments for the armature is conveniently formed by means of a metal stamping such as shown in FIGURE 1. The stamping can be formed in a single stamping operation, or by a notching operation wherein the metal sheet is indexed and the metal between adjacent winding segments is stamped out in successive operations. Each of the winding segments in the completed stamping includes an inner tab 10, a generally straight radial portion 11, an outer tab 13 and an arcuate portion 12 between the straight portion and the outer tab. The angular distance between the inner and outer tabs of a winding segment is approximately equal to the distance between adjacent pole centers of the associated magnetic pole structure. In the completed stamping the winding segments remain attached to the surrounding metal via the inner and outer tabs 10 and 13 respectively. The stamping is provided with various apertures 14 which facilitate the assembly operations and provide registry when the stampings are aligned.

Figure 2:
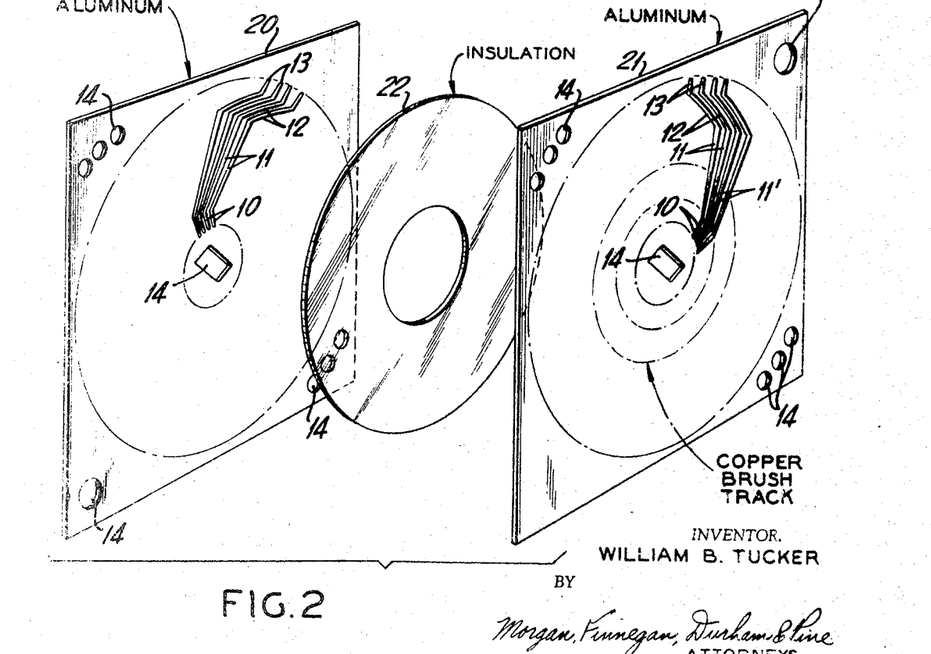
FIGURE 2 is a perspective assembly diagram illustrating the manner in which two such stampings and an insulated carrier are assembled to form an armature unit.

As illustrated in FIGURE 2, a two layer wave type armature is assembled using a pair of these stampings. As will be described hereinafter in greater detail, there are several methods of providing the copper brush track. The brush track can be added before or after the notching operation and before and after the fabrication into the multi-layer winding. At this point it can be assumed that a copper brush track 11' was deposited on aluminum stamping 21 subsequent to the stamping operation. Otherwise, the two stampings 20 and 21 are identical, but, one stamping is reversed relative to the other, that is, one stamping is rotated 180° about an axis in the plane of the stamping. As a result, when the stampings are aligned as shown in FIGURE 2, the arcuate portions of the winding segments in the stamping 20 extend from the outer tab in a clockwise direction whereas the arcuate portions of the winding segments in stamping 21 extend from the outer tabs in a counterclockwise direction.

A dielectric disc 22 is inserted between the stampings to serve as the winding carrier. This carrier is constructed from any suitable electrically insulating material and is in the shape of an annulus. The diameter of the central opening and the outer diameter of the disc are selected so that the carrier fits between the inner and outer tabs of the stamping.

Figure 3:
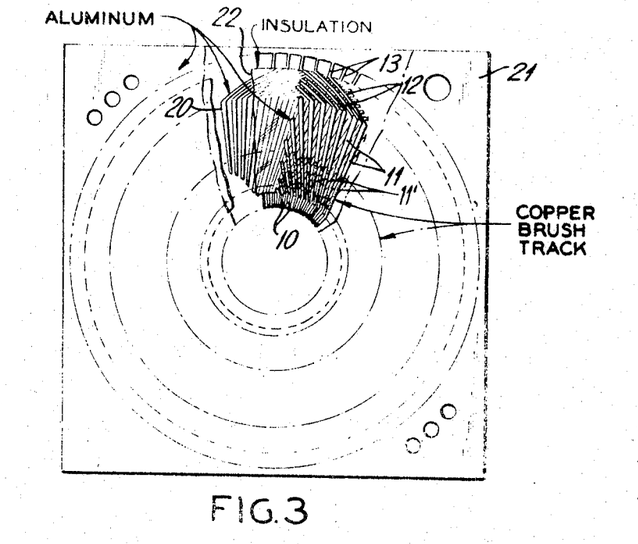
FIGURE 3 is a plan view with portions broken away illustrating the armature unit after the center has been blanked and the inner bridging connections completed.

The stampings are brought together to form a sandwich as indicated in FIGURE 3 including the insulating carrier between the stampings and the the brush track on the outside. The positions of the stampings are then adjusted so that the inner and outer tabs come into alignment. Next, the central portions of the stampings are blanked out to free the ends of the individual inner tabs 10. Adjacent tabs in the upper and lower stampings are then welded together to form the inner bridging connections between the winding segments.

Figure 4:
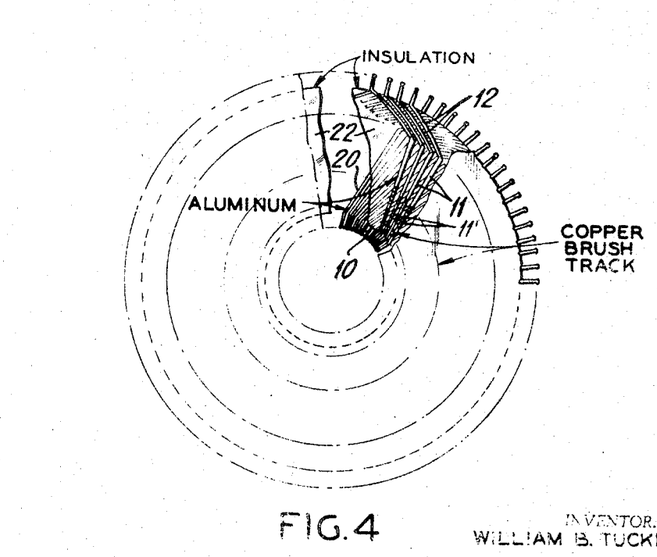
FIGURE 4 is a plan view with portions broken away illustrating the armature unit after surrounding excess material has been removed and the outer bridging connections completed.

The excess material surrounding the conductor segments is next removed by a suitable blanking operation and the adjacent outer tabs in the two stampings are then welded together by similar process to form the outer bridging connections. The completed armature structure appears as shown in FIGURES 4 and 5.

Figure 5:
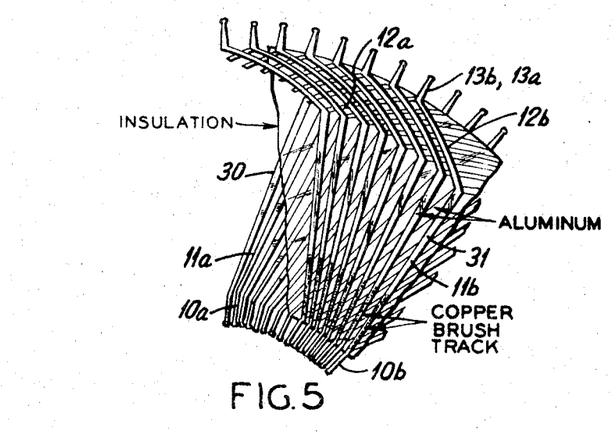
FIGURE 5 is an enlarged partial plan view of the completed armature structure.

As can best be seen in FIGURE 5, radial winding segment 30 from stamping 20 including its inner tab 10a, straight radial portion 11a, arcuate portion 12a and outer tab 13a is on one side of the carrier and is joined to winding segment 31 from stamping 21 including its outer tab 13b, arcuate portion 12b, straight portion 11b and inner tab 10b located on the opposite side of the carrier. These winding segments are joined by the bridging connection formed by tabs 13a and 13b and when joined form an armature turn. The spacing between the radial portions of the winding segments of an armature turn is approximately the same as the spacing between pole centers of the associated magnetic pole structure. In an eight pole machine, for example, an armature turn spans approximately 90°. Inner tab 10b is connected to the beginning of the next armature turn and four such successive armature turns make up an armature loop which spans slightly less than 360°. The actual span of an armature loop is selected so that the end of the armature loop is at the proper point for the beginning of the adjacent armature loop and therefore the winding progresses with successive armature loops being slightly clockwise with respect to the preceding one. The armature winding is therefore evenly spread about the annular carrier surface and eventually returns to the starting point to thereby provide a closed winding.

Figure 6:
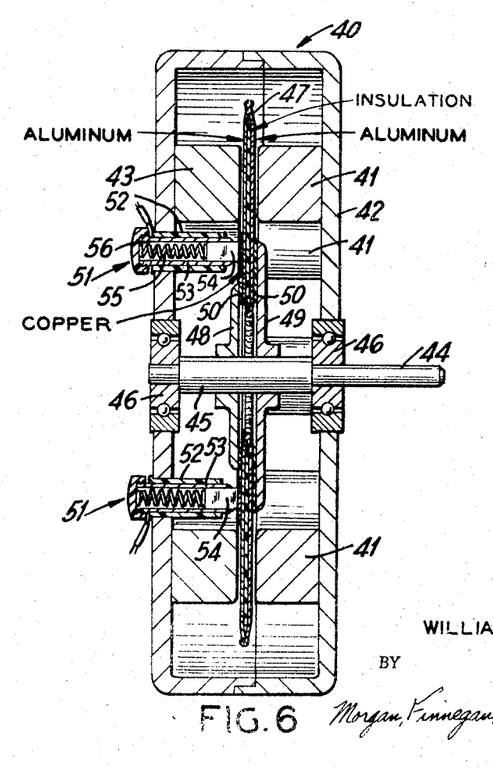
FIGURE 6 is a cross sectional view of a completed disc type motor including the armature assembly constructed in accordance with FIGURES 1–5.

The completed motor assembly is shown in FIGURE 6 and includes a housing 40 having two similar members each including a circular base plate and an integral cylindrical portion extending from the periphery of the base plate. The illustrative motor is an eight pole machine and therefore eight cylindrical slugs 41 of an aluminum-nickel-cobalt alloy material such as Alnico are secured to one of the base plates 42. These magnetic slugs are evenly distributed to form an annular array of pole faces and are each secured to the base plate by means of an adhesive such as epoxy cement. The magnetic slugs are magnetized to provide pole faces of alternating north and south magnetic polarities. An iron ring 43 is positioned directly opposite the annular array of pole faces to complete the magnetic path between adjacent pole faces and to provide a working air gap between the ring and the magnetic slugs which accommodates the armature winding.

The armature is mounted on a shaft 44 provided with an increased diameter portion 45 positioned between a pair of ball bearings 46 to prevent axial movement. The bearings are centrally mounted within suitable openings in the base plates. The armature 47, constructed in the manner illustrated in FIGURES 1–5, is clamped between a pair of flanges 48 and 49 of a hub structure which are rigidly secured to shaft 44. Dielectric spacers 50 are positioned to insulate the armature winding from the hub structure.

Each of the brush holders 51 includes an insulated bushing 52 having an annular shoulder at one end so that the bushing can conveniently be inserted through a suitable opening in one of the base plates. A conductive metallic sleeve 53 is secured within the bushing and is dimensioned to accommodate a rectangular brush 54. The brush is urged toward the armature by means of a compression spring 55 located between the brush and an insulated cap 56 threaded on to the end of sleeve 53 which extends beyond the end of bushing 52. The armature is positioned so that the copper brush track is adjacent the brushes. The electrical leads are attached to conductive sleeves 53 and the electrical circuit to the copper winding segments is completed via sleeves 53 and brushes 54. Flange 49 preferably has sufficient diameter to provide structural backing for the armature opposite the brushes. The number of brushes and the position relative to the pole faces depends upon the armature winding configuration and the current carrying requirements of the brushes.

Disc type armatures can similarly be constructed to include more than two layers. Increasing the number of layers has the desirable effects of increasing the number of series turns in the winding to thereby increase the operating voltage.

Figure 7:
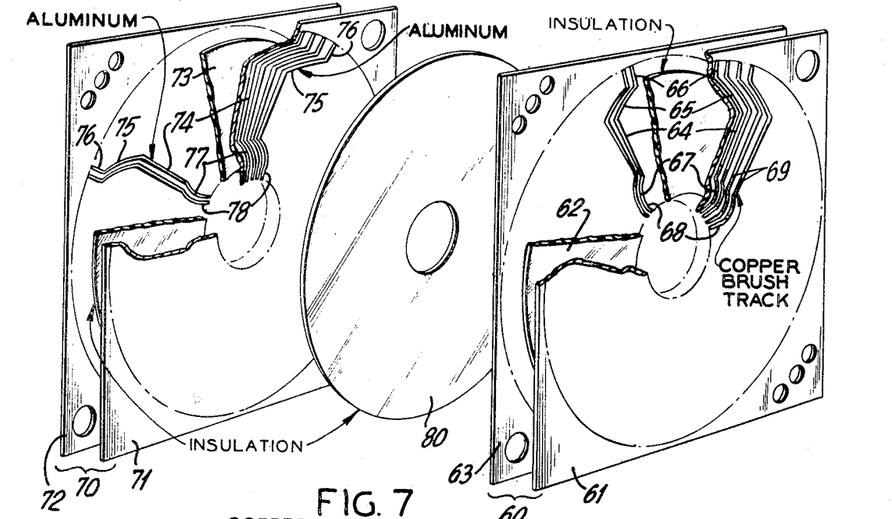
FIGURE 7 is a perspective assembly drawing illustrating the manner in which a four layer armature is constructed.

To construct a four layer armature, a pair of two layer subassemblies 60 and 70 as shown in FIGURE 7 are first constructed. Subassembly 60 includes two stampings having the same configuration, stamping 61 being the one provided with a copper brush track 69. These stampings are placed on opposite sides of a dielectric carrier 62. The winding segments of the stampings each include a straight portion 64, an outer arcuate portion 65 connected to an outer tab 66, and an inner arcuate portion 67 connected to an inner tab 68. One of these stampings is reversed with respect to the other so that the inner and outer arcuate portions of stamping 61 extend from the outer tabs in a clockwise direction (as viewed in FIGURE 7), and the inner and outer arcuate portions of stamping 62 extend away from the outer tabs in a counterclockwise direction. On stamping 61 the copper brush track surface 69 covers the inner arcuate portion 67 and part of straight portion 64.

The stampings are formed in the manner previously described. A sandwich is then formed including a pair of the stampings with the dielectric disc in between. Dielectric disc 62 is in the shape of an annulus with the central opening and outer diameter selected so that the annulus fits between the inner and outer tabs of the stampings. After the tabs are aligned, the centers of the stampings are blanked out and adjacent inner tabs are welded to form the inner bridging connections.

The other two layer subassembly is constructed in similar fashion and includes a pair of identical aluminum stampings 71 and 72 with a dielectric disc carrier 73 in between. Stampings 71 and 72 differ somewhat from stampings 61 and 63. Each winding segment of stampings 71 and 72 includes a straight portion 74, an outer arcuate portion 75 connected to an outer tab 76, and an inner arcuate portion 77 connected to an inner tab 78. One of the stampings is reversed so that in the completed subassembly the arcuate portions of stamping 71 extend from the straight portion in a counterclockwise direction (as viewed in FIGURE 7), and the arcuate portions of stamping 72 extend away from the straight portion in a counterclockwise direction. It should be noted that the angular distance between the inner and outer tabs of stampings 61 and 63 is approximately equal to the distance between pole centers of the associated magnetic stator structure. In stampings 71 and 72 the inner and outer tabs are substantially aligned on the same radius with straight portions 74 being offset with respect to the tabs. After stampings 71 and 72 have been formed they are aligned and the centers are blanked out. The inner tabs are then welded to form the inner bridging connections.

Figure 8:
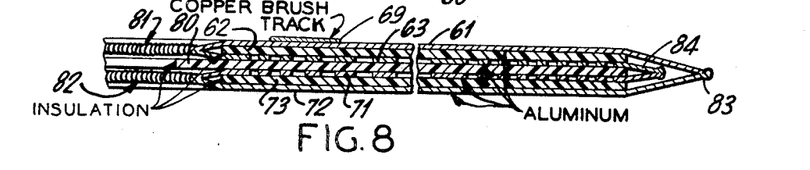
FIGURE 8 is a cross sectional view of the four layer armature.

The two subassemblies are then brought together on opposite sides of a third dielectric carrier disc 80. This carrier disc is also in the shape of an annulus. The central opening has a diameter somewhat less than the opening inside the inner tabs of the subassemblies. The outer diameter of the disc is selected so that the disc fits within the arrays of outer tabs. The outer tabs are aligned and the assembly is then clamped. The excess material surrounding the outer tabs is removed and the outer tabs are then welded to form the outer bridging connections. As shown in FIGURE 8, dielectric disc 80 fits between the two separate arrays of inner tabs 81 and 82, and therefore prevents shorting contact between these tabs. The outer tabs are adjacent one another in a single array (one set of outer tabs 83 is shown inside the other set 84, but this is merely for clarity of illustration). The arrangement shown in FIGURE 8 with two separate inner tab arrays and a single outer tab array is preferable since the available spacing between inner tabs is less than that between the outer tabs.

Figure 9:
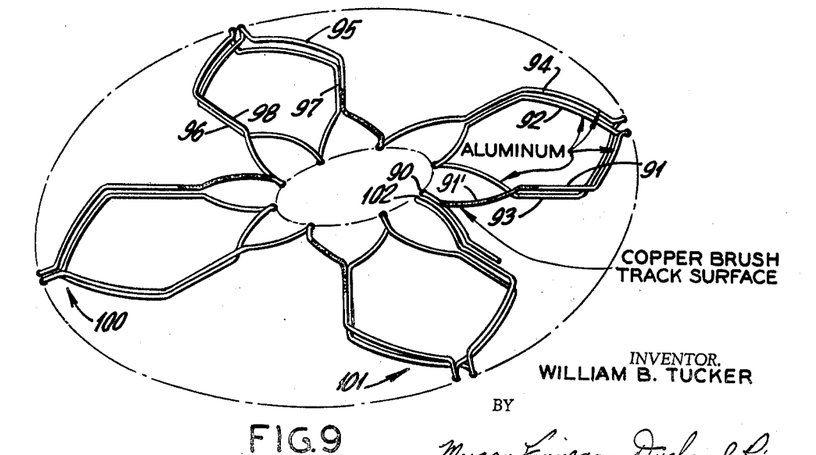
FIGURE 9 is a perspective view illustrating the configuration of an armature loop in the four layer armature winding.

In the completed four layer armature the winding segments are interconnected as shown in FIGURE 9 wherein one armature loop including eight armature turns is shown for an eight pole machine. The armature loop can be traced beginning at point 90 and proceeding through a winding segment 91, including the copper brush track surface 91', this segment being in the top layer, and then through winding segment 92 in the third layer to complete one armature turn. The next armature turn is in essentially the same annular position in the armature and includes a winding segment 93 in the fourth layer and another winding segment 94 in the second layer. The first pair of armature turns span approximately 90°. Winding segment 94 is connected to the beginning of the next pair of armature turns which similarly include a winding segment 95 in the top layer providing the brush track surface followed by three winding segments 96–98 in the lower three layers. The third and fourth pairs of armature turns 100 and 101 follow in succession to complete the first armature loop. This armature loop spans slightly less than 360° and ends at point 102 which will be the beginning of the next adjacent armature loop. The winding continues in this fashion and eventually returns to the starting point 90 to complete an evenly distributed armature winding.

Figure 10:
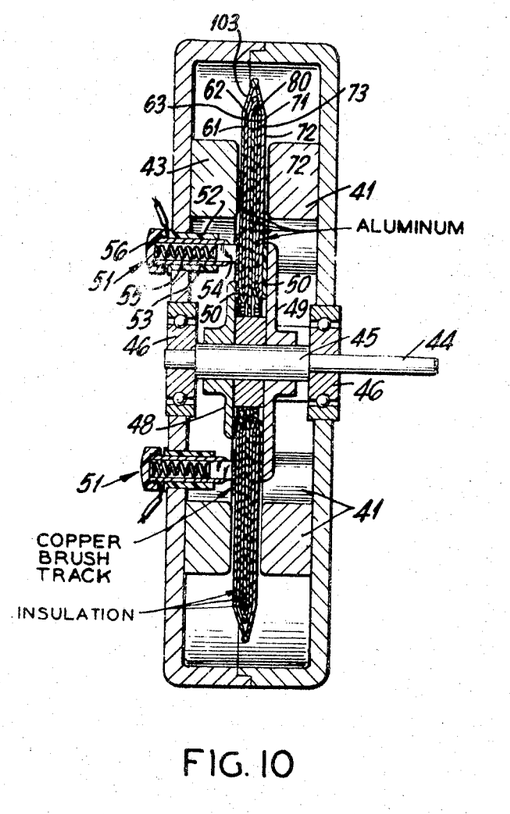
FIGURE 10 is a cross sectional view of a completed motor including a four layer disc type armature.

The complete motor is illustrated in FIGURE 10 and is essentially the same as that previously described in FIGURE 6 except for the armature. The armature 103 includes the four layers of aluminum winding segments 61–72 and a copper brush track on the exposed surface of layer 61. The armature is positioned so that the copper brush track is adjacent brushes 54. With the four layer armature, a bushing 104 is placed surrounding the shaft between flanges 48 and 49. The inner diameter of the center carrier disc 80 which extends beyond the inner tabs has the same diameter as the bushing and therefore acts to center the armature relative to the shaft.

There are several methods by which the copper brush track can be provided upon an aluminum armature. One method involves the use of copper clad aluminum where unwanted copper is removed by etching. The sequence of steps and the principal variations thereof are illustrated in the FIG. 11 flow diagram.

The armature layer which is to carry the copper brush track is made from a copper clad aluminum sheet material such as is available from Metals & Controls Inc., a division of Texas Instruments. The clad material includes an aluminum layer having a thickness for providing the desired armature characteristics and a copper layer several thousandths of an inch thick.

Figure 11:
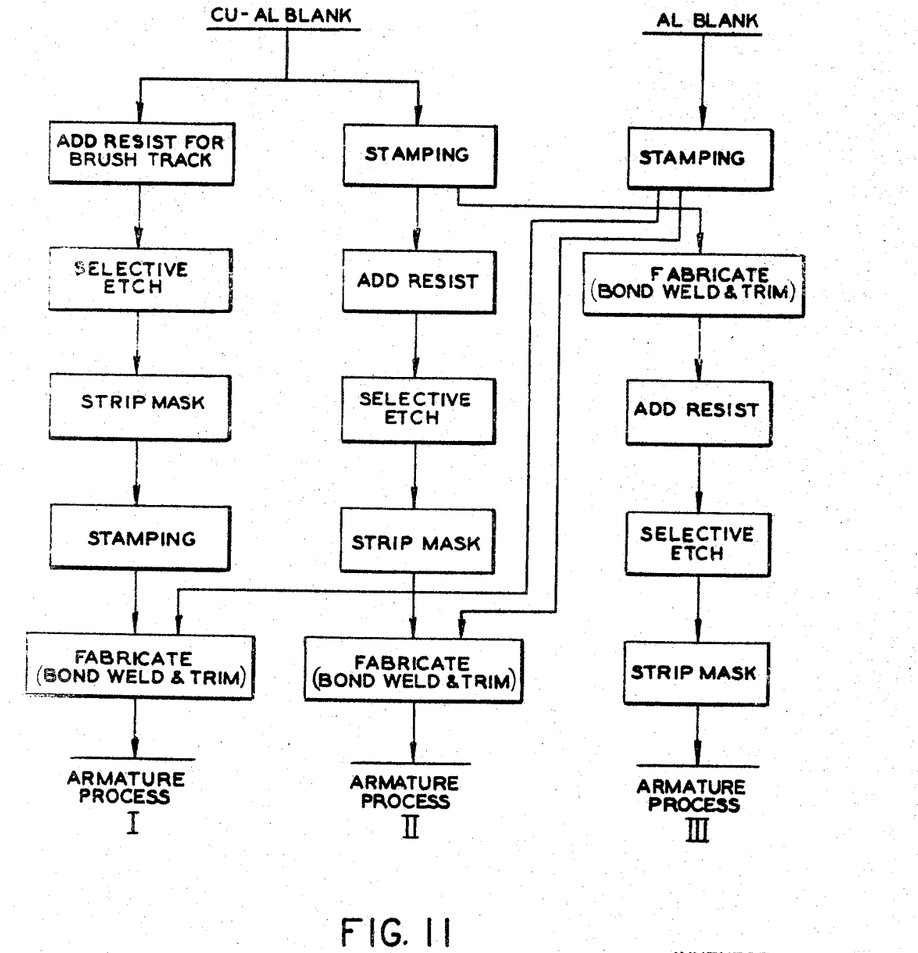
FIGURE 11 is a flow diagram illustrating processes for making armatures utilizing copper clad aluminum blanks.

In process I shown in FIG. 11, the brush track is formed on the Cu-Al blank prior to the stamping operation. A suitable plating resist is screened onto the blank in the form of an annular ring centered on the blank. A Warnow clear 145–14–W plating resist produces satisfactory results but other acid resistant mask systems can be used. Preferably pigment free masks are used. The mask is then baked for a suitable time and at a suitable temperature. For the Warnow mask the resist is baked at 250° F. for one half hour.

The copper is then removed from the unmasked areas by means of a selective etch which dissolves copper but does not affect the aluminum. Nitric acid 1:1 at room temperature provides effective results, but other commercial metal strippers can also be used. After the etching is completed the blank passes through a water rinse.

Next the mask is stripped from the blank to leave an exposed copper brush track. Trichloroethylene is preferable for stripping the Warnow mask. However, other chlorinated hydrocarbon, ketone and commercial solvent systems can be used.

When following process I in FIGURE 11 the blank with the copper brush track and the plain aluminum blanks pass through the stamping operation to provide stampings such as illustrated in FIGURE 1. This can be achieved either through a single stamping operation or by a notching operation, the latter being more fully described in co-pending application Ser. No. 614,201.

The armature winding is then completed by bonding the layers with suitable insulation material therebetween, trimming off the waste material, and welding the tabs to form the bridging connections.

Process II shown in FIGURE 11 is similar except that the copper clad blank passes through the stamping operation prior to formation of the brush track. The resist is added after the stamping is formed. The unwanted copper is then removed with a selective etch and the mask is then stripped to expose the copper brush track. The aluminum stampings are assembled by bonding the layers, removing the scrap material and welding the tabs to form the interconnections.

Process III is another variation. In this case the copper clad and aluminum stampings are formed and then assembled to form the armature winding such that the copper clad surface is exposed. The resist is then screened onto the copper clad surface, the unwanted copper is removed by a selective etch and finally the resist is removed to expose the copper brush track.

Figure 12:
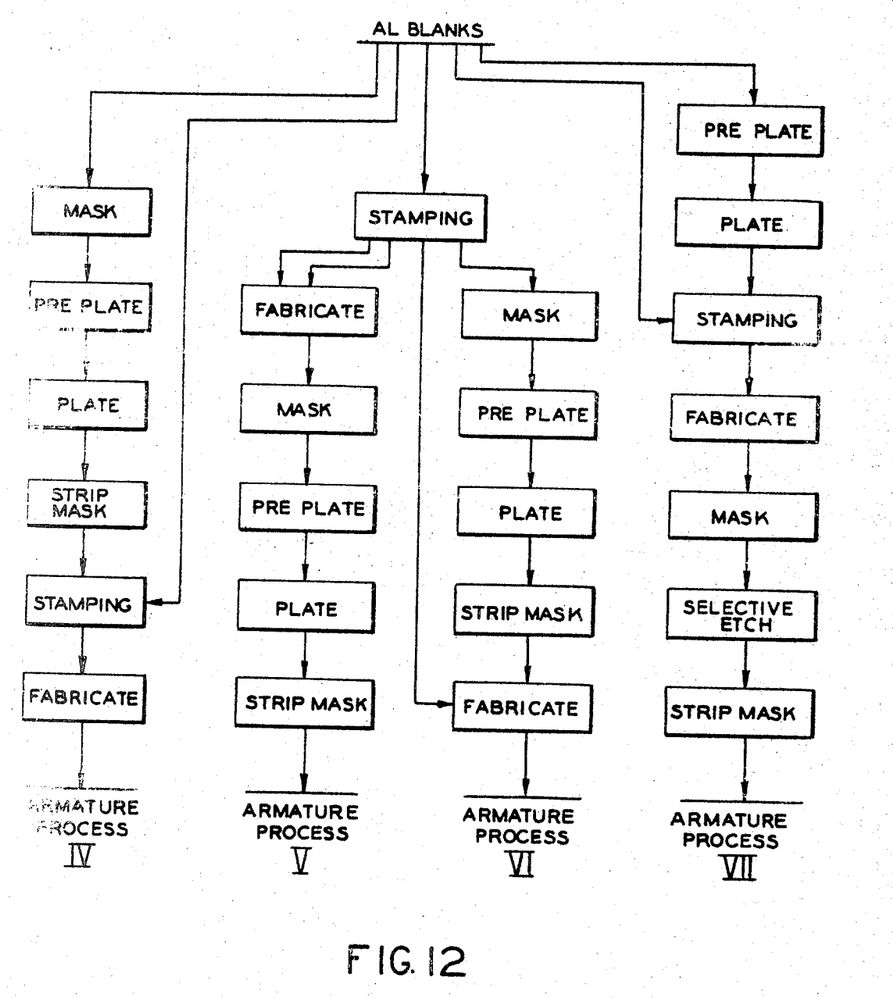
FIGURE 12 is a flow diagram illustrating processes for making armatures utilizing aluminum blanks and depositing copper thereon.

The FIGURE 12 flow diagram illustrates another method of forming the copper brush track for an aluminum armature. According to process IV a mask is first screened onto an aluminum blank leaving the annular brush track area open. The back side of the blank is completely covered by the mask. The mask should be of a suitable resist material compatible with the remaining plating operations. Warnow clear 145–14–W was used successfully for zincate and the following plating cycles. The mask is then baked, 250° F., one half hour for the Warnow mask.

In order to achieve good copper adhesion a pre-plating operation is usually necessary such as by exposing the aluminum blank to zincate. Preferably the blank is first passed through an acid dip including 50% nitric acid by volume. After a water rinse, the blank is passed through a zinc immersion dip for between one half and one minute at 60° to 80° F. The zinc immersion dip solution preferably includes sodium hydroxide 70 oz./gal. and standard zincate zinc oxide 13 oz./gal. After a double water rinse the blank is exposed to copper cyanide for from one to three minutes and is then rinsed. The pre-plating operation is completed by an acid dip in 20% hydrochloric acid (by volume) and a final water rinse.

The blank is then copper plated to provide a copper brush track of the desired thickness of several thousandths of an inch. The mask is thereafter removed with the appropriate solvent. Trichloroethylene is used to strip the Warnow mask, but other chlorinated hydrocarbon, ketone and commercial solvent systems may be used.

The blank with the copper brush track and the plain aluminum blanks then pass through the stamping operation and the stampings are then assembled by bonding the layers, removing the waste material and welding the bridging interconnections.

Process V illustrated in FIGURE 12 includes a similar plating operation. However, the aluminum blanks are first stamped, and the stampings are assembled to form the armature winding by bonding the layers, welding the bridging connections and trimming the waste material. The unit is then covered by a resist material leaving the annular brush track area exposed. The copper brush track is then formed by passing the unit through the pre-plating and plating operations, and the process is completed by removing the resist material with a suitable solvent.

Process VI is similar except that the copper brush track is formed on one of the aluminum stampings prior to fabrication of armature winding.

In process VII the aluminum blank is copper plated on one side prior to the stamping operation. The plated blank, and the plain aluminum blanks then pass through the stamping operation and are thereafter assembled to form the armature winding. The mask is then added, in this case covering the copper brush track area. The copper in the unmasked area is removed by a selective etch (described in process I) and the mask is then removed. It should be noted that the plated aluminum blank in process VII is comparable to the copper clad aluminum blanks used in processes I–III thereby suggesting several additional variations for process VII.

Figure 13:
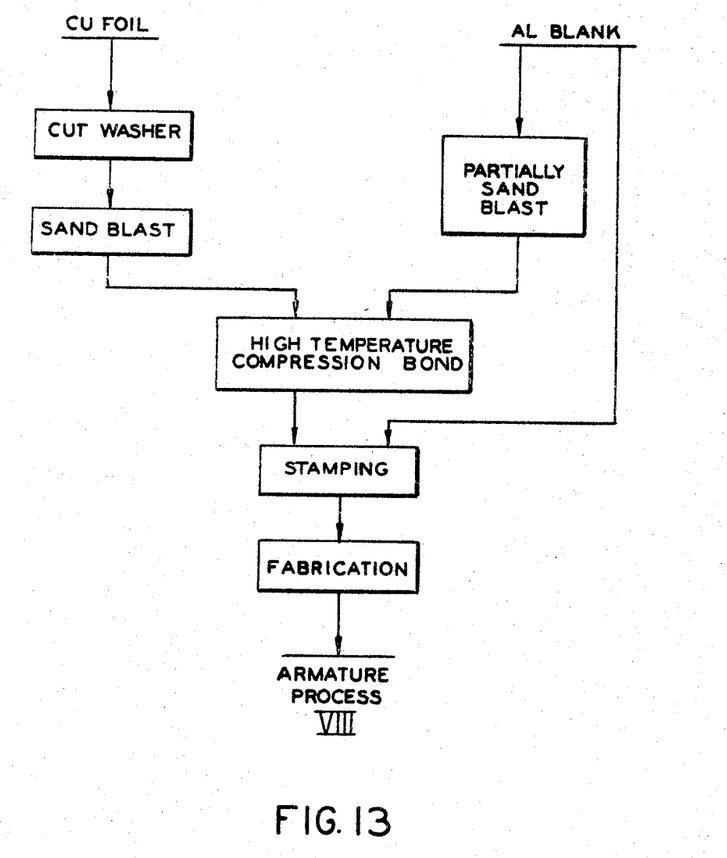
FIGURE 13 is a flow diagram illustrating a process for making armatures utilizing copper foil.

Another method is illustrated in FIGURE 13. Copper foil is cut to provide a washer several thousandths of an inch thick and of a width suitable for forming the brush track. One side of the washer and a corresponding area on an aluminum blank are sand blasted. The copper washer is then bonded to the aluminum blank by means of suitably dimensioned heated platens. A platen temperature of approximately 600° C., a pressure of about 1000 p.s.i. and a dwell time of five seconds provides a proper bond.

Thereafter the blank with the copper washer, and the plain aluminum blanks pass through the stamping operations and are then assembled to form the armature by bonding the layers, welding the bridging connections and trimming the waste material.

Process VIII will provide most economical results for large volume production whereas the other processes are better for smaller production runs. In the processes where the copper brush track is formed prior to the stamping operation, i.e., processes I, IV and VIII, special precautions should be taken during the stamping operation to accommodate blanks having a varying thickness.

While only a few illustrative embodiments of the structure and methods have been described in detail it should be obvious that there are numerous variations within the scope of this invention. For example, the armature can be constructed having a conical or cylindrical shape as well as the disc shape specifically illustrated. The invention is more particularly defined in the appended claims.

I claim:
1. An armature for an electrical machine having a multiple stator structure comprising:
   a plurality of uniformly distributed arrays of aluminum winding segments;
   means secured between adjacent arrays for electrically insulating the winding segments in one array from those in an adjacent array;
   bridging connections for interconnecting said aluminum winding segments to form armature turns in at least one series electrical circuit with successive winding segments being in different arrays and spaced approximately in accordance with the distance between adjacent pole centers of the associated stator structure; and
   an annular commutator brush track including an exposed copper surface metallurgically secured on a portion of the winding segments of one of said arrays.

2. An armature for an electrical machine having a multipole stator comprising:
   a plurality of substantially uniform arrays of aluminum winding segments each lying in a different plane parallel to said first plane, each of said aluminum winding segments extending in a generally radial direction,
   means insulating each array of winding segments from winding segments in other arrays,
   bridging connections for interconnecting said winding segments to form armature turns in at least one series circuit with successive winding segments being in different arrays and spaced apart circumferentially approximately in accordance with the distance between pole centers of the associated stator structure, and
   a copper brush track including an exposed copper surface metallurgically secured covering a portion of each of the winding segments in one of said arrays.

3. An armature in accordance with claim 2 wherein said armature includes two parallel arrays of aluminum winding segments.

4. An armature in accordance with claim 2 wherein said armature includes four parallel arrays of aluminum winding segments.

5. A rotating electrical machine comprising:
   a stator structure having magnetic poles distributed to form an annular air gap, said poles alternating in magnetic polarity,
   a disc shaped rotor mounted for rotation in said air gap and including a closed loop armature winding having
      a plurality of substantially uniform arrays of aluminum winding segments lying in different planes within said air gap, said aluminum winding segments each extending transversely of said annular air gap,
   means insulating winding segments in one of said arrays from winding segments in the other of said arrays, bridging connections for interconnecting said winding segments to form a closed armature winding including at least one series circuit with successive winding segments being in different arrays and spaced apart circumferentially in accordance with the distance between centers of said magnetic poles, and a copper brush track including an exposed copper surface metallurgically bonded to cover a portion of each of the winding segments in one of said arrays, and brushes disposed to engage said copper brush track.

6. An armature in accordance with claim 5 wherein said armature consists of two parallel arrays of aluminum winding segments.

7. An armature in accordance with claim 5 wherein said armature consists of four parallel arrays of aluminum winding segments.

References Cited

UNITED STATES PATENTS

| 3,144,574 | 8/1964 | Henry-Baudot | 310—268 |
| 3,382,570 | 5/1968 | Knapp | 310—268 |

FOREIGN PATENTS

| 1,197,174 | 8/1968 | Germany. |

WARREN E. RAY, Primary Examiner

R. SKUDY, Assistant Examiner